(12) United States Patent
Baggelaar et al.

(10) Patent No.: US 6,339,371 B1
(45) Date of Patent: Jan. 15, 2002

(54) SELF CONTAINED, BUCKLE ATTACHABLE AND ACTUATED ALARM DEVICE

(76) Inventors: William C. Baggelaar; David Baggelaar, both of 8411 Lilienthal Ave., Westchester, CA (US) 90045

( * ) Notice: Subject to any disclaimer, the term of this patent is extended or adjusted under 35 U.S.C. 154(b) by 0 days.

(21) Appl. No.: 09/811,861

(22) Filed: Mar. 19, 2001

(51) Int. Cl.[7] .................................................. B60Q 1/00
(52) U.S. Cl. ..................... 340/457.1; 340/457; 340/438; 340/687; 180/268
(58) Field of Search .............................. 340/457.1, 457, 340/438, 687; 180/268

(56) References Cited

U.S. PATENT DOCUMENTS

| | | | |
|---|---|---|---|
| 4,222,028 A | 9/1980 | Danchilla | 340/457 |
| 4,727,358 A | 2/1988 | Burt, III | 340/691 |
| 4,755,789 A | 7/1988 | Paschal | 340/693 |
| 4,849,733 A | 7/1989 | Conigliaro et al. | 340/457.1 |
| 4,987,403 A | 1/1991 | Apfel | 340/457.1 |
| 5,207,480 A * | 5/1993 | Johnson et al. | 297/344 |
| 5,394,955 A | 3/1995 | Howard | 340/457.1 |
| 5,483,221 A | 1/1996 | Mutter et al. | 340/457 |
| 5,760,684 A * | 6/1998 | Orbach | 340/457.1 |
| 5,871,063 A * | 2/1999 | Young | 340/457.1 |
| 5,890,238 A * | 4/1999 | Votel | 5/81.1 |

* cited by examiner

*Primary Examiner*—Jeffery Hofsass
*Assistant Examiner*—Daniel Previl
(74) *Attorney, Agent, or Firm*—John D. Gugliotta

(57) ABSTRACT

A self contained, buckle attachable and actuated alarm device apparatus is provided having an actuation bracket having a blade receiving slot designed to receive and be supported by a seat belt buckle insertion tab. The seat belt buckle insertion tab is impinged between a retention orifice and a stop flange. An alarm device is attached to to an underside of a "U" shaped buckle housing. The actuation bracket including a vertical actuation surface designed to align with and impinge against a plunger type insertion switch.

5 Claims, 3 Drawing Sheets

SELF CONTAINED, BUCKLE ATTACHABLE AND ACTUATED ALARM DEVICE

RELATED APPLICATIONS

The present invention was first described in Disclosure Document Number 477,951 filed on Aug. 4, 2000. There are no previously filed, nor currently any co-pending applications, anywhere in the world.

BACKGROUND OF THE INVENTION

1. Field of the Invention

The present invention relates generally to seat belt alarm devices and, more particularly, to a self contained, buckle attachable and actuated alarm device.

2. Description of the Related Art

Child safety is among the most important issues that concern today's parents. These concerns are heightened in the area of automobile safety. When children reach the age/size where the use of a child safety seat is unavailable, parents resort to seatbelts to protect their children's lives. However, as many parents know, children at that age are prone to play with the buckles that secure the seatbelt, creating a dangerous situation should the buckle become released. As a result, parents must monitor their children, which creates the additional risk of taking their eyes off the road.

A search of the prior art did not disclose any patents that read directly on the claims of the instant invention; however, the following references were considered related.

The following patents disclose a sensor and alarm for prompting the use of seatbelts.

U.S. Pat. No. 5,760,684 issued in the name of Orbach

U.S. Pat. No. 4,849,733 issued in the name of Conigliaro et al.

The following patents describe a device for playing a recorded message to remind vehicle occupants to fasten their seatbelt.

U.S. Pat. No. 4,987,403 issued in the name of Apfel

U.S. Pat. No. 4,755,789 issued in the name of Paschal

U.S. Pat. No. 4,727,358 issued in the name of Burt, III

U.S. Pat. No. 4,222,028 issued in the name of Danchilla.

U.S. Pat. No. 5,483,221 issued in the name of Mutter et al. discloses a seatbelt usage indicating system with a sensor.

U.S. Pat. No. 5,394,955 issued in the name of Howard describes a seat belt switch that controls power to convenience functions of a vehicle.

U.S. Pat. No. 4,346,364 issued in the name of Takagi et al. discloses a low fuel warning voice system for a vehicle.

Of considerable relevance is Of particular interest are U.S. Pat. No. 4,727,358 issued in the name of Burt, III and U.S. Pat. No. 5,760,684 issued in the name of Orbach. While some feature are incorporated into this invention in combination, other elements are different enough as to make the combination distinguished over the prior art as an aftermarket, self contained, buckle attachable and actuated alarm device including the use of alarm actuation by direct mechanical linkage to the buckle impingement cam.

Consequently, a need has been felt for providing an automatic means by which the seatbelts of children can be monitored to ensure they remain buckled.

SUMMARY OF THE INVENTION

It is therefore an object of the present invention to provide an improved means by which the seatbelts of children can be monitored to ensure they remain buckled.

It is a feature of the present invention to provide an improved self contained, buckle attachable and actuated alarm device including the use of alarm actuation by direct mechanical linkage to the buckle impingement cam.

Briefly described according to the preferred embodiment of the present invention, an apparatus that alerts a motor vehicle driver that a seatbelt has been unlatched is provided. The invention is an electronic device which provides an audible annunciation that a seat belt has been unbuckled. The device is placed upon the buckle portion of the seat belt and is armed and activated via a small switch when the matching seat belt tab is inserted. When the seat belt is opened, the tab removed, and the switch is once again activated, a voice synthesizer alerts the driver that the seat belt is now unlatched. While the verbal warning can be virtually anything, it is envisioned that a verbal phrase such as "SEAT BELT IS NOW UNLATCHED" would be the most effective. In this manner the driver can be assured that seat belts, especially those on children, remained latched while the car is in motion. The voice synthesizer, along with the switch and the battery are contained within a suitable plastic container that does not interfere with the operation of the seatbelt, nor does it produce a source of possible injury in the case of an accident.

The use of the present invention provides automatic assurance to drivers that children and others are safely belted while traveling in a motor vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
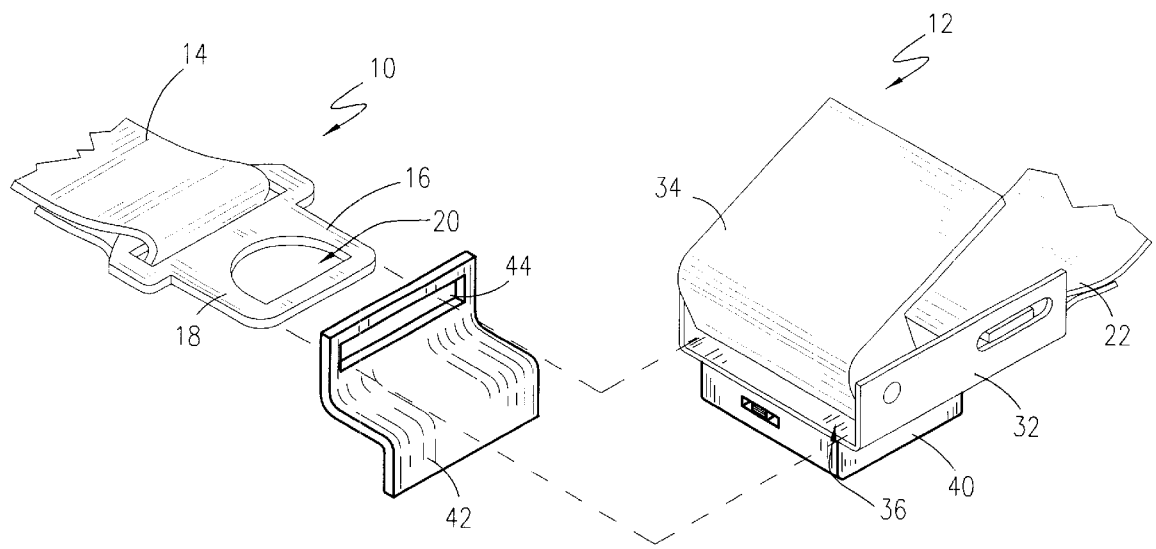
FIG. 1 is a perspective view of a self contained, buckle attachable and actuated alarm device according to the preferred embodiment of the present invention.

In order to describe the complete relationship of the invention, it is essential that some description be given to the manner and practice of functional utility and description of an otherwise conventional seat belt 10 and buckle 12 currently available within the art. Generally, a first web belt 14 is terminated at one end securely to the vehicle (not shown) and terminated at the other end at an attachment blade 16. The attachment blade 16 is formed of thin, flat metal, and includes an insertion tab 18 forming a retention orifice 20 and a stop flange 22 that prevents over insertion of the blade 16. Oppositely, a second web belt 22 is terminated at one end securely to the vehicle (not shown) and terminated at the other end at a generally "U" shaped buckle housing 32. The buckle housing 32 pivotally supports a release lever 34 such as to form an impingement slot 36 for receiving of the blade 16 such as to impinge a locking cam 38 within the retention orifice 20 such as to prevent release of the blade 16 from the buckle 12 absent puling up on the release lever 34.

In conjunction with this manner and practice of functional utility and description of an otherwise conventional seat belt system, the best mode for carrying out the invention is presented in terms of its preferred embodiment, herein depicted within the Figures.

1. Detailed Description of the Figures

Figure 2:
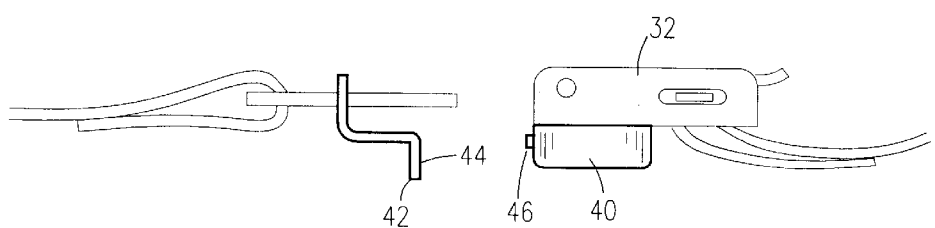
FIG. 2 is a side elevational view thereof.

Referring now to FIGS. 1–2, a self contained, buckle attachable and actuated alarm device apparatus 40 is shown, according to the present invention, for use with a conventional seat belt buckle system as is conventionally available. The alarm device apparatus 40 is designed to attach to the underside of the "U" shaped buckle housing 32. An actuation bracket 42 having a blade receiving slot 44 is designed to receive and be supported by the insertion tab 18 between the retention orifice 20 and the stop flange 22. The actuation bracket 42 includes a vertical actuation surface 44 designed to align with and impinge against an actuation means 46, herein shown as a plunger type insertion switch.

Figure 3A:
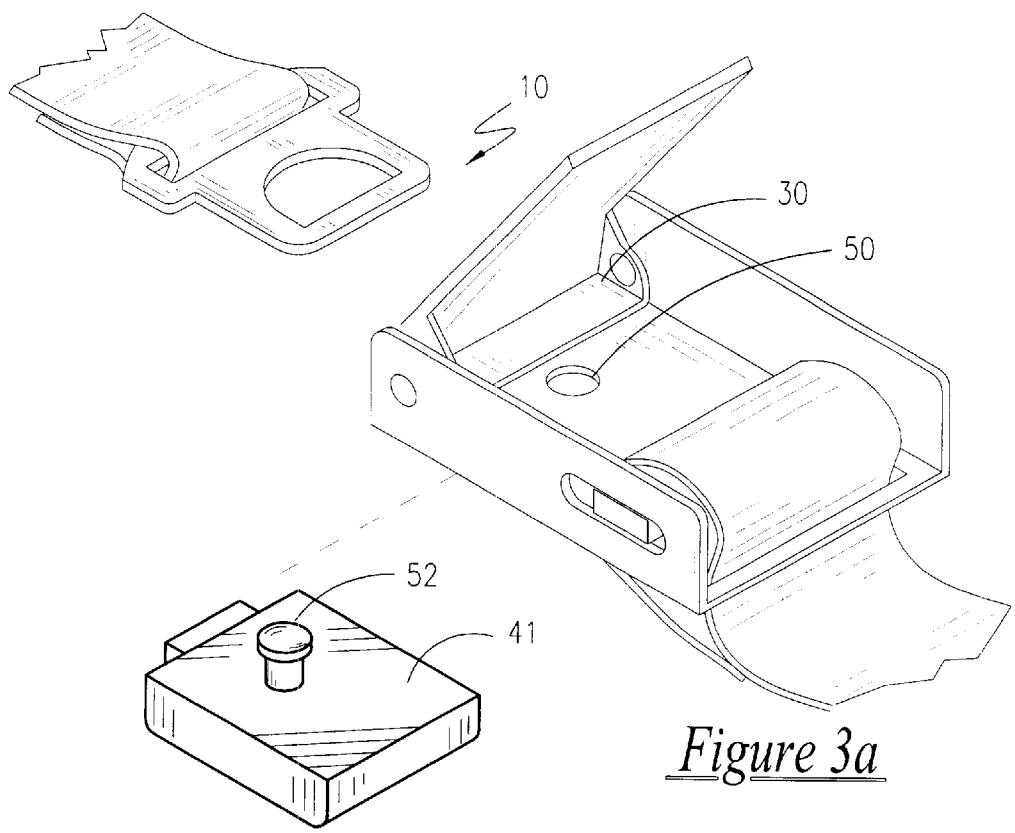
FIG. 3a is an exploded top front perspective view thereof.

Referring to FIG. 3a, a first preferred embodiment of an attachment means is shown for attaching the alarm device apparatus 40 to the underside of the "U" shaped buckle housing 32. Generally formed within the lower surface of the buckle housing 32 is an orifice 50, herein shown as a housing orifice that is generally aligned with an opposed to the locking cam 38. In this configuration, an snap impingement fastener 52 is formed within the upper surface of the housing 41 that encloses the alarm device apparatus 40. Having radially extended flanges protruding outward from the center point of the snap impingement fastener 52, the fastener 52 can be inserted into the orifice 50.

Figure 3B:
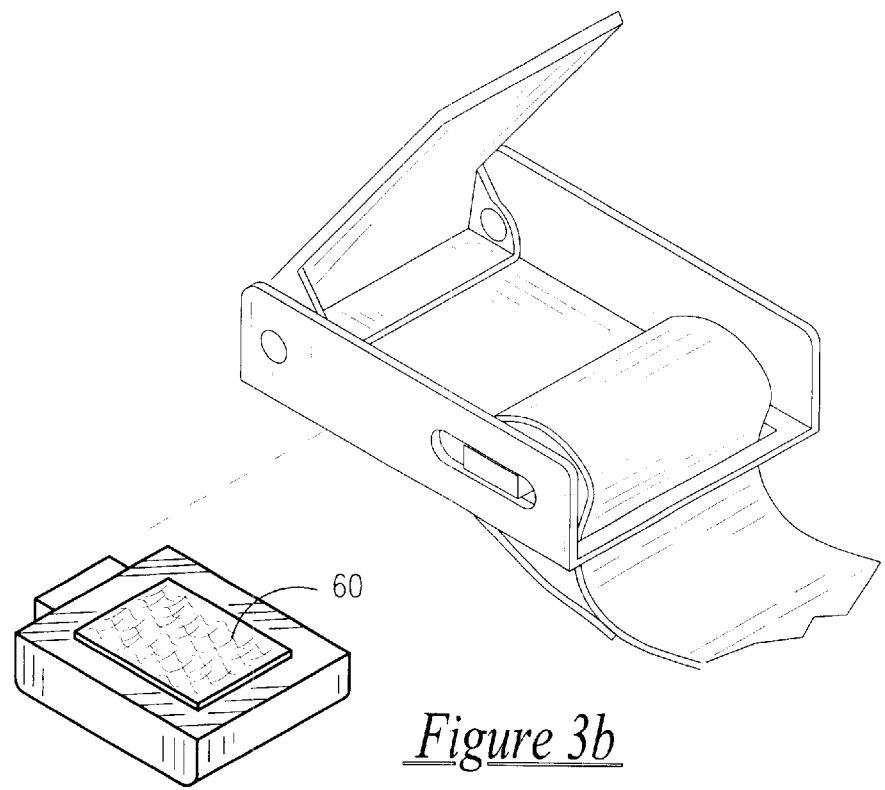
FIG. 3b is an exploded top front perspective view thereof according to an alternate embodiment of an attachment means for use therewith.

Referring now to FIG. 3b, an alternate embodiment of an attachment means is shown for attaching the alarm device apparatus 40 to the underside of the "U" shaped buckle housing 32. In this embodiment, an adhesive 60 is affixed to the upper surface of the housing 41 to thereby adhere the lower surface of the buckle housing 32 to the upper surface of the housing 41.

Figure 4:
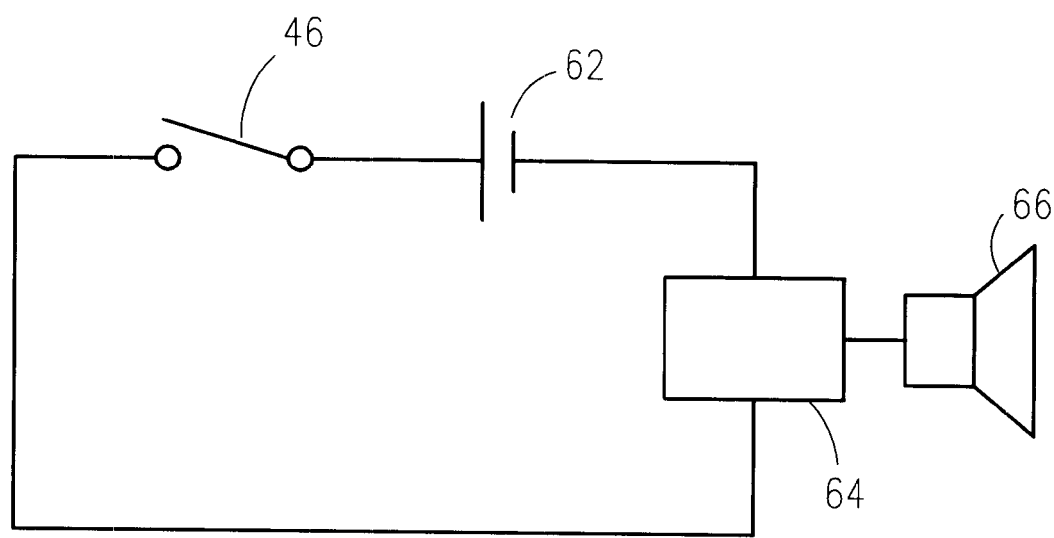
FIG. 4 is an electrical schematic for the control circuitry for use therewith.

Finally, FIG. 4 shows in greater detail the control circuitry that is controlled by the actuation means 46, herein shown as a plunger type insertion switch. Once engaged, a battery 62 engages a solid state recording/playing circuit 64 that allows electronically stored audio message to be transmitted to a speaker 66. It is anticipated that one skilled in the art would be capable of providing such audible play/record capability in many ways such as to accomplish the same functionality.

2. Operation of the Preferred Embodiment

To use the present invention, a message is recorded into the solid state recording/playing circuit 64. It is envisioned that a verbal phrase such as "SEAT BELT IS NOW UNLATCHED" would be the most effective. The actuation bracket 42 is slid onto the blade 16, and the blade 16 inserted into the buckle 12. In this position, the alarm device apparatus 40 is attach to the underside of the "U" shaped buckle housing 32 such that the vertical actuation surface 44 aligns with and impinges against the actuation means 46. Subsequently, each time the seat belt buckle is detaches, the audible message will be played as a safety reminder to the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A self contained, buckle attachable and actuated alarm device apparatus comprising:

an actuation bracket having a blade receiving slot designed to receive and be supported by a seat belt buckle insertion tab between a retention orifice and a stop flange;

attachment means for attaching said alarm device apparatus to an underside of a "U" shaped buckle housing; and said actuation bracket including a vertical actuation surface designed to align with and impinge against an actuation means.

2. The alarm device apparatus of claim 1, wherein said actuation means comprises a plunger type insertion switch.

3. The alarm device apparatus of claim 1, wherein said attachment means formed as an orifice generally formed within the lower surface of the buckle housing that is generally aligned with an opposed to a locking cam, such that a snap impingement fastener formed within the upper surface of the housing encloses the alarm device apparatus.

4. The alarm device apparatus of claim 3, wherein said snap impingement fastener includes radially extended flanges protruding outward from a center point of said snap impingement fastener for insertion into said orifice.

5. The alarm device apparatus of claim 1, wherein said attachment comprises an adhesive affixed to the upper surface of the housing to thereby adhere the lower surface of the buckle housing to the upper surface of the housing.

* * * * *